(12) United States Patent
Kwon et al.

(10) Patent No.: US 9,305,211 B2
(45) Date of Patent: Apr. 5, 2016

(54) METHOD, APPARATUS, AND COMPUTER-READABLE RECORDING MEDIUM FOR CONVERTING DOCUMENT IMAGE CAPTURED BY USING CAMERA TO DEWARPED DOCUMENT IMAGE

(71) Applicants: Samsung Electronics Co., Ltd., Suwon-si, Gyeonggi-do (KR); Seoul National University R&DB Foundation, Seoul (KR)

(72) Inventors: Mu-sik Kwon, Seoul (KR); Nam-ik Cho, Seoul (KR); Sang-ho Kim, Hwaseong-si (KR); Beom-su Kim, Seoul (KR); Won-kyo Seo, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 5 days.

(21) Appl. No.: 14/499,925

(22) Filed: Sep. 29, 2014

(65) Prior Publication Data
US 2015/0093033 A1 Apr. 2, 2015

(30) Foreign Application Priority Data

Sep. 30, 2013 (KR) ........................ 10-2013-0116902

(51) Int. Cl.
*G06K 9/46* (2006.01)
*G06K 9/66* (2006.01)
(Continued)

(52) U.S. Cl.
CPC .......... *G06K 9/00442* (2013.01); *G06T 3/0031* (2013.01); *G06T 5/006* (2013.01); *G06K 2009/363* (2013.01)

(58) Field of Classification Search
CPC ................... G06K 9/00442; G06K 2009/363; G06T 3/0031; G06T 5/006
USPC .......................................... 382/195, 199–201
See application file for complete search history.

(56) References Cited

U.S. PATENT DOCUMENTS

| 6,947,610 | B2* | 9/2005 | Sun .......................... G06T 3/00 353/69 |
| 7,697,776 | B2* | 4/2010 | Wu ...................... G06K 9/3283 358/3.27 |

(Continued)

OTHER PUBLICATIONS

Koo et al.; Composition of a Dewarped and Enhanced Document Image From Two View Images, IEEE Transactions on Image Processing, vol. 18, No. 7, Jul. 2009.

(Continued)

*Primary Examiner* — Samir Ahmed
(74) *Attorney, Agent, or Firm* — Jefferson IP Law, LLP

(57) ABSTRACT

A method and apparatus for generating a dewarped document using a document image captured using a camera are provided. The method includes obtaining the document image captures using the camera, extracting text lines from the document image captured using the camera, determining a projection formula to convert positions of respective points constituting the extracted text lines to coordinates projected on a plane of the dewarped document, determining a target function used to calculate a difference between text lines projected on the place of the dewarped document using the projection formula and real text lines, calculating parameters that minimize the target function, and converting the document image to the dewarped document by substituting the calculated parameters into the projection formula.

22 Claims, 9 Drawing Sheets

(51) Int. Cl.
  *G06K 9/00* (2006.01)
  *G06T 5/00* (2006.01)
  *G06T 3/00* (2006.01)
  *G06K 9/36* (2006.01)

(56) References Cited

U.S. PATENT DOCUMENTS

| | | | | |
|---|---|---|---|---|
| 2006/0140504 A1* | 6/2006 | Fujimoto | ............. | G06T 3/0031 382/275 |
| 2006/0210192 A1* | 9/2006 | Orhun | ..................... | G06K 9/32 382/275 |
| 2007/0206877 A1 | 9/2007 | Wu et al. | | |
| 2009/0016606 A1* | 1/2009 | Meyer | ................. | G06K 9/3283 382/176 |
| 2009/0185736 A1* | 7/2009 | Nepomniachtchi | ...... | G06K 9/36 382/137 |
| 2011/0091092 A1 | 4/2011 | Nepomniachtchi et al. | | |

OTHER PUBLICATIONS

Stamatopoulos et al.; Goal-Oriented Rectification of Camera-Based Document Images; IEEE Transactions on Image Processing, vol. 20, No. 4, Apr. 2011.

* cited by examiner

FIG. 7
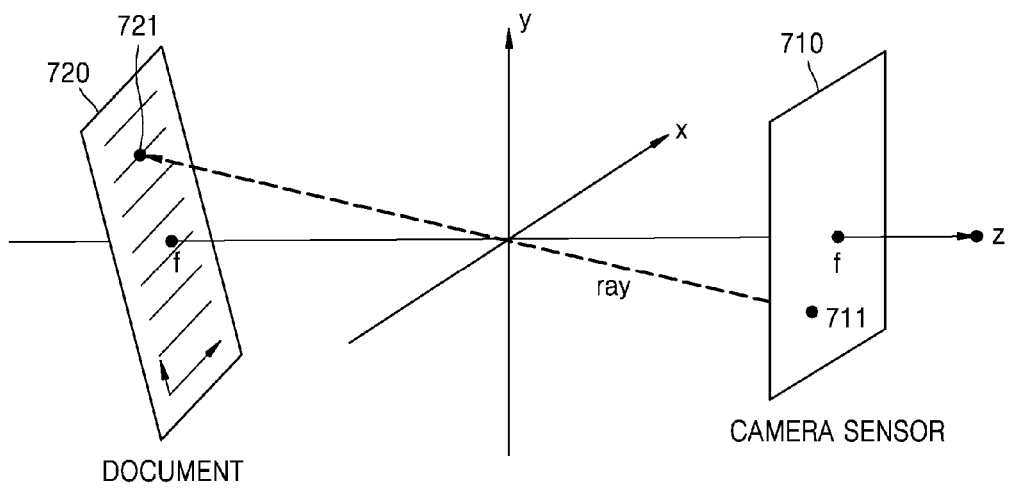
DOCUMENT          CAMERA SENSOR
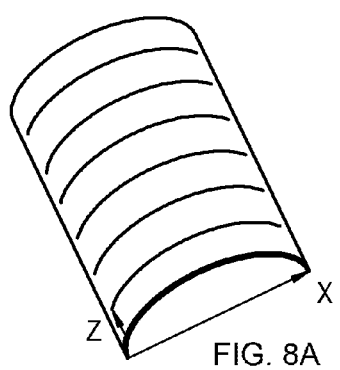
FIG. 8A
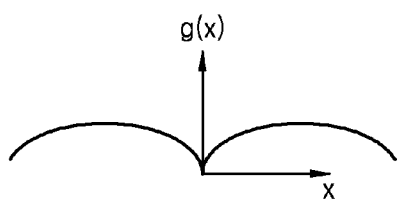
FIG. 8B

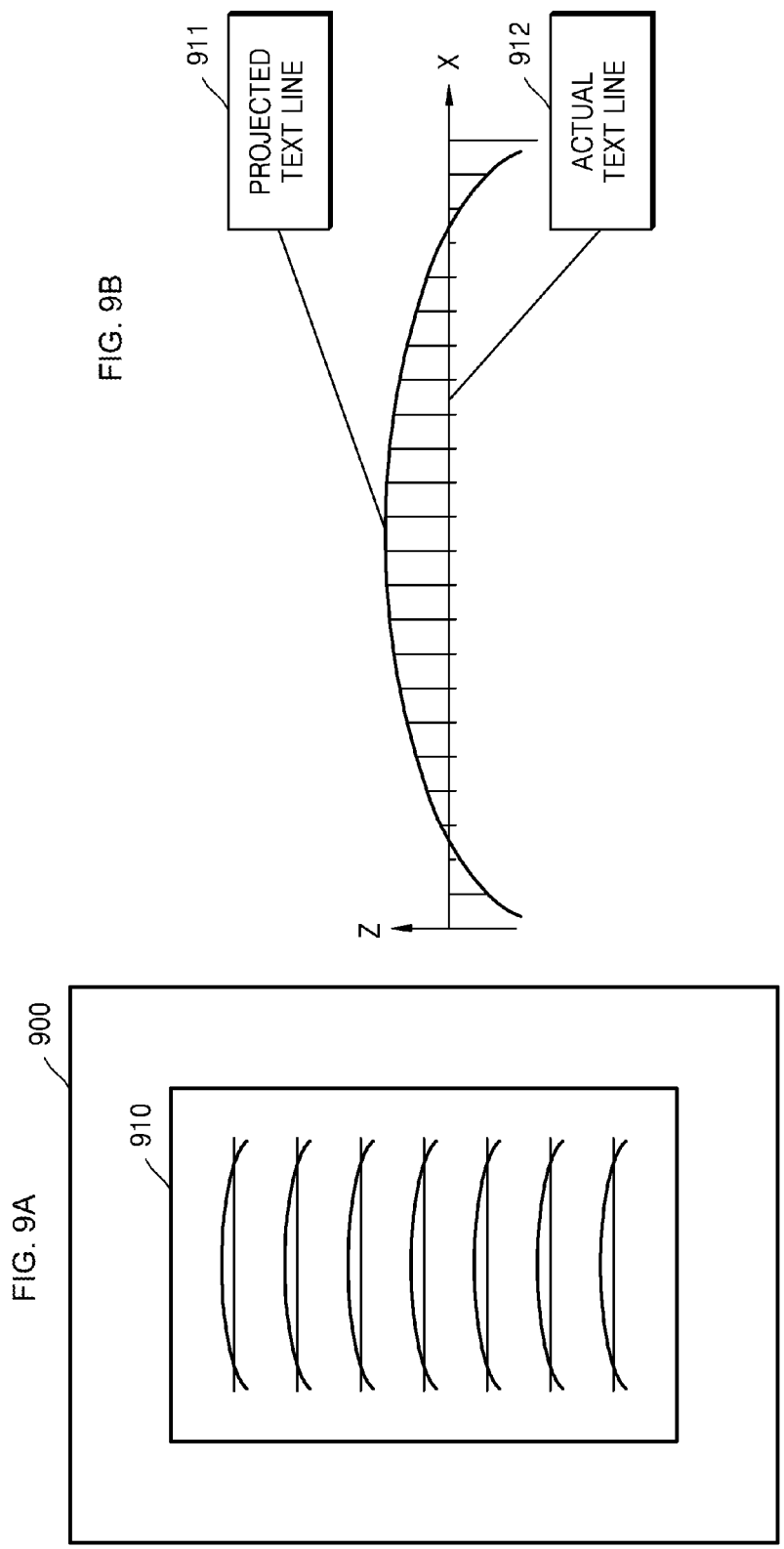

METHOD, APPARATUS, AND COMPUTER-READABLE RECORDING MEDIUM FOR CONVERTING DOCUMENT IMAGE CAPTURED BY USING CAMERA TO DEWARPED DOCUMENT IMAGE

CROSS-REFERENCE TO RELATED APPLICATION(S)

This application claims the benefit under 35 U.S.C. §119(a) of a Korean patent application filed on Sep. 30, 2013 in the Korean Intellectual Property Office and assigned Serial number 10-2013-0116902, the entire disclosure of which is incorporated by reference.

TECHNICAL FIELD

The present disclosure relates to a method and apparatus for generating a dewarped document by using a document image captured by using a typical camera. More particularly, the present disclosure relates to a method and apparatus for converting an atypical document image to a dewarped document by extracting text lines from one document image, calculating a parameter for optimizing a projection formula, and using the projection formula to project the extracted text lines onto a plane of the dewarped document.

BACKGROUND

In the related art, a flatbed scanner may be used to digitize a document. However, a flatbed scanner is difficult to carry and can be used only in limited environments. Thus, portable scanners have been developed to overcome the drawbacks but are expensive and have size limitations. Also, frequently, only single-sheet documents can be scanned by using a portable scanner.

Accordingly, a method of using an image of a document captured by using a digital camera to generate a dewarped document without a scanner has been developed. According to the method of generating a dewarped document by using a digital camera, it is easy to obtain an image. However, the image may be variously distorted due to environments under which the image is acquired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for generating a dewarped document using a document image captured using a camera, in which a dewarped document may also be effectively generated by using a document of a non-standard form, by using one sheet of a document image.

Another aspect will be set forth in part in the description which follows and, in part, will be apparent from the description, or may be learned by practice of the presented embodiments.

In accordance with an aspect of the present disclosure, a method of converting a document image captured using a camera to a dewarped document, is provided. The method includes obtaining the document image captured using the camera, extracting text lines from the document image, determining a projection formula to convert positions of respective points constituting the extracted text lines to coordinates projected on a plane of the dewarped document, determining a target function (E) which is used to calculate a difference between text lines projected on the plane of the dewarped document using the projection formula and real text lines, calculating parameters that minimize the target function (E), and converting the document image to the dewarped document by substituting the calculated parameters into the projection formula.

In accordance with another aspect of the method of the present disclosure, the projection formula may be determined based on an angle between a plane of the document image and the camera, a cross-section of the document image, and a focal distance of the camera.

In accordance with another aspect of the method of the present disclosure, the angle may be a three-dimensional rotational angle $\Theta=[\theta_1\ \theta_2\ \theta_3]^T$ between the plane of the document image and the camera, the cross-section of the document image may be a curve $g(x)=\Sigma a_m x^m$, and the focal distance of the camera may be a focal distance f of the camera, where a horizontal direction of the document image is an x-axis direction, a projection direction is a z-axis direction, and $(\theta_1\ \theta_2\ \theta_3)$ are angles between the plane of the document image and the camera with respect to x, y, and z axes, respectively.

In accordance with another aspect of the method of the present disclosure, the target function (E) may be $E(\theta_1,\theta_2,\theta_3, \{l^k\},$ $$\{a_m\}) = \sum_k \sum_i E^2(k, i),$$

where $E(k,i)=y_i^k - l^k$, and $y_i^k$ denotes y conversion coordinates obtained by projecting an i-th point of a k-th text line of an image captured using the camera on a plane of a document, and $l^k$ denotes y coordinates of the k-th text line on a plane of a real document.

In accordance with another aspect of the method of the present disclosure, the calculating of the parameters further includes calculating the parameters $(\theta_1,\theta_2,\theta_3,\{l^k\},\{a_m\})$ that minimize the target function.

In accordance with another aspect of the method of the present disclosure, the determining of the target function (E) further includes determining the target function (E) using uniformity of distances between the text lines.

In accordance with another aspect of the method of the present disclosure, the target function (E) may be $E(\theta_1,\theta_2,\theta_3, \{l^k\},$ $$\{a_m\}) = \sum_k \sum_i E^2(k, i),$$

where $E(k,i)=y_i^k - l^k$, and $y_i^k$ denotes y conversion coordinates obtained by projecting an i-th point of a k-th text line of an image captured by using the camera, on a plane of a document, and $l^k$ denotes y coordinates of the k-th text line on a plane of a real document.

In accordance with another aspect of the method of the present disclosure, the calculating may further include calculating the parameters $(\theta_1,\theta_2,\theta_3,\{l^k\},\{a_m\})$ that minimize the target function.

In accordance with another aspect of the method of the present disclosure, the method may further include storing the dewarped document.

In accordance with another aspect of the method of the present disclosure, the method may further include displaying the dewarped document.

In accordance with another aspect of the present disclosure, an apparatus for converting a document image captured using a camera to a dewarped document is provided. The apparatus includes a document image obtaining unit configured to obtain the document image captured using the camera, a text line extracting unit configured to extract text lines from the document image, a determining unit configured to determine a projection formula to convert positions of respective points constituting the extracted text lines to coordinates projected on a plane of the dewarped document and to determine a target function (E) which is used to calculate a difference between the text lines projected on the plane of the dewarped document using the projection formula and real text lines, and a converting unit configured to calculate parameters that minimize the target function and to convert the document image to the dewarped document by substituting the calculated parameters into the projection formula.

In accordance with another aspect of the apparatus of the present disclosure, the projection formula may be determined based on an angle between a plane of the document image and the camera, a cross-section of the document image, and a focal distance of the camera.

In accordance with another aspect of the apparatus of the present disclosure, the angle may be a three-dimensional rotational angle $\Theta=[\theta_1 \ \theta_2 \ \theta_3]^T$ between the plane of the document image and the camera, and the cross-section of the document image may be a curve $g(x)=\Sigma a_m x^m$, and the focal distance of the camera may be a focal distance f of the camera, where a horizontal direction of the document image is an x-axis direction, and a projection direction is a z-axis direction, and ($\theta_1 \ \theta_2 \ \theta_3$) are angles between the plane of the document image and the camera with respect to x, y, and z axes, respectively.

In accordance with another aspect of the apparatus of the present disclosure, the target function (E) may be $E(\theta_1,\theta_2,\theta_3, \{l^k\},$ $$\{a_m\}) = \sum_k \sum_i E^2(k, i),$$

where $E(k,i)=y_i^k-l^k$, and $y_i^k$ denotes y conversion coordinates obtained by projecting an i-th point of a k-th text line of an image captured by using the camera on a plane of a document, and $l^k$ denotes y coordinates of the k-th text line on a plane of a real document.

In accordance with another aspect of the apparatus of the present disclosure, the converting unit is further configured to calculate the parameters $(\theta_1,\theta_2,\theta_3,\{l^k\},\{a_m\})$ that minimize the target function.

In accordance with another aspect of the apparatus of the present disclosure, the determining unit is further configured to determine the target function (E) using uniformity of distances between the text lines.

In accordance with another aspect of the apparatus of the present disclosure, the target function (E) may be $E(\theta_1,\theta_2,\theta_3, \{l^k\},$ $$\{a_m\}) = \sum_k \sum_i E^2(k, i),$$

where $E(k,i)=y_i^k-l^k$, and $y_i^k$ denotes y conversion coordinates obtained by projecting an i-th point of a k-th text line of an image captured using the camera on a plane of a document, and $l^k$ denotes y coordinates of the k-th text line on a plane of a real document.

In accordance with another aspect of the apparatus of the present disclosure, the converting unit is further configured to calculate the parameters $(\theta_1,\theta_2,\theta_3,\{l^k\},\{a_m\})$ that minimize the target function.

In accordance with another aspect of the apparatus of the present disclosure, the apparatus may further include a storage unit configured to store the dewarped document.

In accordance with another aspect of the apparatus of the present disclosure, the apparatus may further include a display unit configured to display the dewarped document.

In accordance with another aspect of the present disclosure, a non-transitory computer readable recording medium having a computer program recorded thereon is provided, the computer program causing a computer to execute the above-described method.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will become apparent from the following description taken in conjunction with the accompanying drawings, in which:

FIG. 7 is a schematic view illustrating coordinates of text lines extracted from a document image, which are projected as coordinates of an image captured using a camera according to an embodiment of the present disclosure;

FIGS. 8A and 8B are schematic views of a cross-section of a document shown as a curve according to various embodiments of the present disclosure;

FIGS. 9A and 9B illustrate text lines extracted from a document image and projected text lines according to various embodiments of the present disclosure;

Throughout the drawings, it should be noted that like reference numbers are used to depict the same or similar elements, features, and structures.

DETAILED DESCRIPTION

Figure 1A:
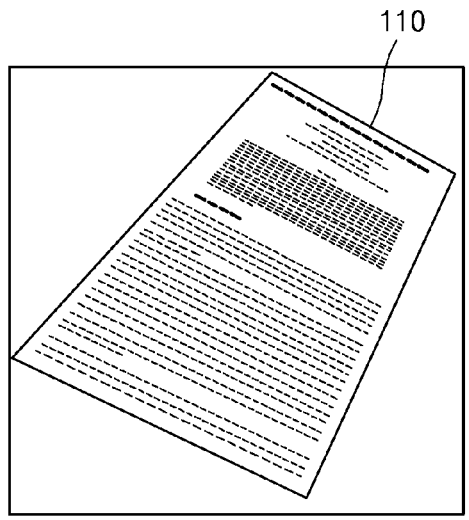
FIGS. 1A, 1B, and 1C illustrate a document image captured using a camera and a dewarped document according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For example, particular shapes, structures, and properties according to a predetermined embodiment described in this specification may be modified in other embodiments without departing from the spirit and scope of the present disclosure. In addition, positions or arrangement of individual components of each of the embodiments may also be modified without departing from the spirit and scope of the present disclosure. Accordingly, the detailed description below should not be construed as having limited meanings but construed to encompass the scope of the claims and any equivalent ranges thereto.

In the drawings, like reference numerals denote like elements in various aspects. Also, in the drawings, portions unrelated to the description are omitted for clarity of the disclosure, and like reference numerals refer to like elements throughout.

FIGS. 1 through 11, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

Hereinafter, the present disclosure will now be described more fully with reference to the accompanying drawings, in which various embodiments of the present disclosure are shown such that one of ordinary skill in the art may easily work the disclosure.

Throughout the present specification, when a constituent element "connects" or is "connected" to another constituent element, the constituent element contacts or is connected to the other constituent element not only directly but also electrically through at least one of other constituent elements interposed therebetween. Also, when a part may "include" a certain constituent element, unless specified otherwise, it may not be construed to exclude another constituent element but may be construed to further include other constituent elements.

Figure 1B:
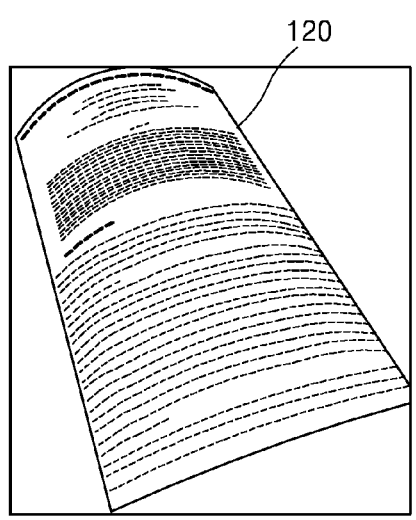
Figure 1C:
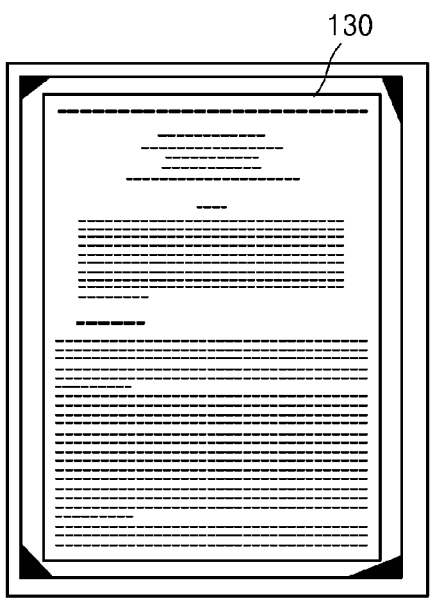

FIGS. 1A to 1C illustrate document images captured using a camera and a dewarped document according to the related art.

Referring to FIGS. 1A and 1B, document images 110 and 120 captured using a typical camera are illustrated, where image distortion according to relative positions between a camera lens and a document is generated or a document image having a curved form is obtained. In particular, a surface of a subject is photographed in an arbitrary manner, and thus, geometrical distortion or perspective distortion results.

Meanwhile, referring to FIG. 1C, a document 130 to be dewarped having a flat surface and a uniform roughness, is illustrated, causing the dewarped document to have minimal distortion. As the dewarped document 130 has a minimal amount of distortion and has a form similar to that of a real document, it is easy to analyze the dewarped document 130 and additional data is easy to acquire using an Optical Character Recognition (OCR) technique. Also, the dewarped document 130 is beneficial for the preservation of documents and may be used in electronic books (e-books).

However, a method of using a camera to generate a dewarped document has advantages over a method of using a scanner. First, compared to a scanner, a camera is compact and easy to carry, and an image may be quickly acquired by using the camera. This advantage is even more prevalent in the current environment in which mobile phones equipped with a high performance camera module are widely supplied. In addition, capturing an image of an object (document) located far away from a camera is possible by using the method, and thus, an image may be acquired without touching an object (document).

Thus, when a dewarped document is obtained by using a camera, the advantages of a method of using a camera and a method of using a scanner may be provided, that is, an image may be easily obtained, and at the same time, utility of a document may be increased by correcting for distortion thereof. The camera which uses this method may function as a personal mobile copier or a scanner, and the camera may be applied to a machine translator or a reading machine for handicapped persons by adding an OCR function.

Figure 2:
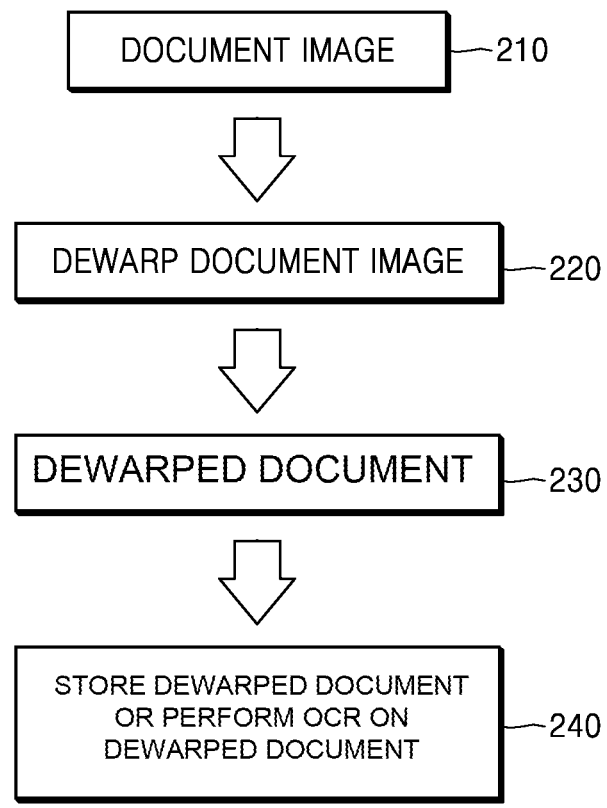
FIG. 2 is a flowchart illustrating a brief operation of converting a document image captured using a camera to a dewarped document according to an embodiment of the present disclosure.

FIG. 2 is a flowchart illustrating a brief operation of converting a document image captured using a camera to a dewarped document according to an embodiment of the present disclosure.

Referring to FIG. 2, a user obtains a document image of a photographed document using a typical camera, particularly, a digital camera, in operation 210. The document image is dewarped through a process of dewarping in operation 220 to be converted to a dewarped document in operation 230. As described above, since a dewarped document has a minimal amount of distortion and has a form similar to that of a real document, operation 240 of extracting additional information from the dewarped document through OCR or storing the dewarped document for preservation is performed.

Dewarping refers to a data processing technique of a camera for correcting an image by resolving issues due to geometric distortion of a subject itself and resolving perspective distortion caused during projection.

In particular, when an image of a flat document is captured from a far distance, a greater amount of distortion is generated. For example, a fish eye effect is a main factor in causing a horizontal line or a vertical line to a curve. When distortion as above is generated, a flat page image including a horizontal line or a vertical line is used to correct a difference between the horizontal line or the vertical line and a curved line.

In methods of extracting text lines and dewarping a document by using the text lines, a feature that text lines are straight lines that are parallel to one another or that distances between the text lines are uniform may be used.

Figure 3A:
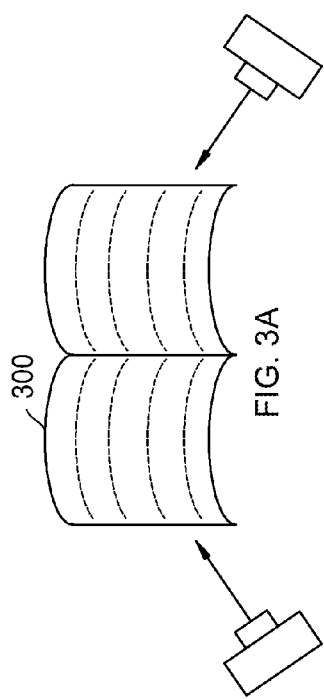
FIGS. 3A, 3B, and 3C are views illustrating a method of converting a document image captured using a camera to a dewarped document according to various embodiments of the present disclosure.
Figure 3C:
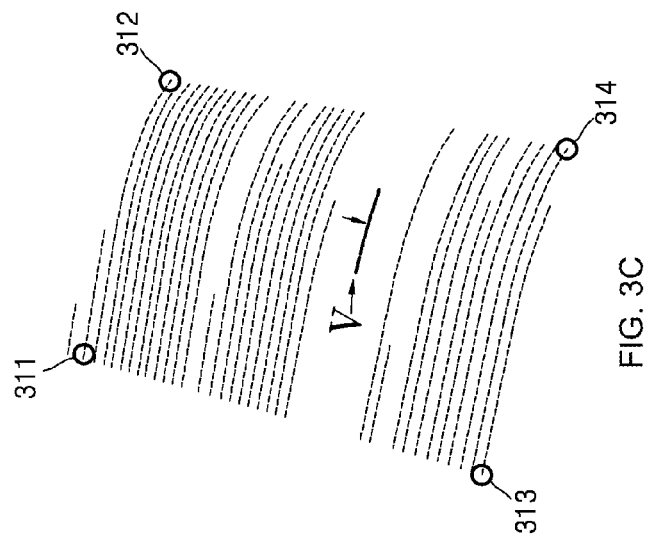
Figure 3B:
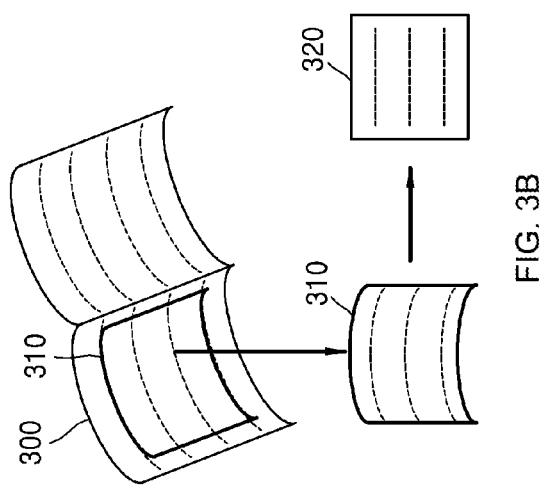

FIGS. 3A to 3C are views illustrating a method of converting a document image captured using a typical camera to a dewarped document according to various embodiment of the present disclosure.

Referring to FIG. 3A, a conversion method is illustrated in which two or more document images captured while changing a position of a document or a position of a camera. For example, a document image obtained by capturing an image of an original document 300, which is an object to be captured, from the left side, and a document image obtained by capturing an image of the original document 300 from the right side are used.

By using a camera and two or more document images having relatively different positions, a three-dimensional form of the original document 300 may be calculated. When the three-dimensional form of the document 300 is calculated, texture of a surface of the document 300 may be restored to that of a plane, and the document image may be converted to a dewarped document by using the texture of the surface of the document.

However, the above method always requires two or more document images. When an original document is available and thus a new document image may be captured, there is no problem in converting to a dewarped document. However, if no original document is available and only one image of a document is captured such that only one document image is obtained, the document image may not be converted to a dewarped document.

In addition, if a document has a two-dimensional plane like a single-sheet document laid flat on a table, a three-dimensional form of the document cannot be calculated even when two or more images are used. Thus, a conversion process in which two or more document images are converted to a dewarped document can only be applied to documents in a three-dimensional form and having a bent portion, such as pages of an open book.

Referring to FIGS. 3B and 3C, a conversion method is illustrated in which one document image is used; however, the conversion method may be used only for standardized documents. If it is known that the original document 300 has one paragraph and this paragraph is quadrangle-shaped, four sides of the quadrangle surrounding the paragraph of the document are estimated.

When a real book is open, pages of the real book have a bent form rather than a planar form, and thus, the four sides of the quadrangle surrounding the paragraph of the document are curved, rather than straight, on a document image which is obtained by capturing an image of a page of the book.

Various methods of estimating the respective curves of the four sides are available, and a method, in which a text area is extracted and a curve 310 that surrounds the text area and is most similar to the text area, is frequently used. Also, as a method of extracting a curve related to a curved quadrangle that surrounds a paragraph, a method of extracting corners 311, 312, 313, and 314 of all sides of the curved quadrangle and calculating curvature of lines that define the curved quadrangle is frequently used, as illustrated in FIG. 3C.

After extracting the respective curves of the four sides as described above, an area surrounded by the curves is converted to an exact rectangle 320, thereby obtaining a dewarped document.

However, like the technique illustrated in FIG. 3A, the forms of documents that may be dewarped according to the techniques of FIGS. 3B and 3C are also limited. The method according to FIGS. 3B and 3C may be applied only when paragraphs of a document form a single square form, and it is difficult to apply the technique when there are several paragraphs and the paragraphs do not form a single square.

In addition, it is difficult to estimate the curves of the four sides surrounding a paragraph, and an error is likely to occur. Even when a small error regarding positions of the curves of the four sides occurs, image quality is remarkably degraded.

Figure 4:
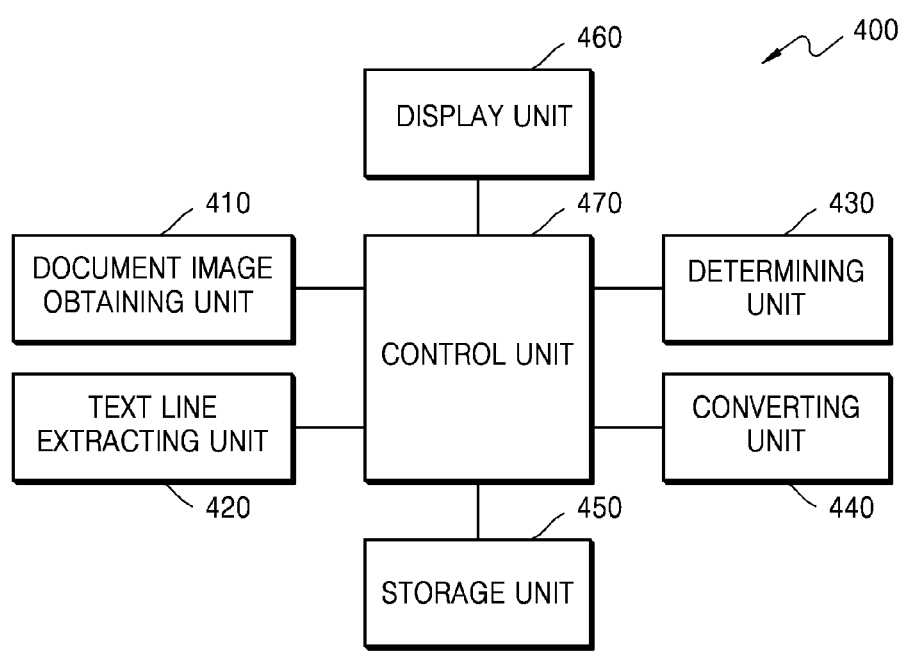
FIG. 4 is a structural diagram of an apparatus for converting a document image captured using a camera to a dewarped document according to an embodiment of the present disclosure.

FIG. 4 is a structural diagram of an apparatus for converting a document image captured using a camera to a dewarped document according to an embodiment of the present disclosure.

Referring to FIG. 4, an apparatus 400 for converting a document image captured using a camera to a dewarped document, is illustrated, where the apparatus 400 includes a document image obtaining unit 410, a text line extracting unit 420, a determining unit 430, a converting unit 440, a storage unit 450, a display unit 460, and a control unit 470.

The document image obtaining unit 410 obtains an image of an original document captured by using a typical camera.

The document image obtaining unit 410 may be connected to a camera so as to immediately obtain a captured document image. In this case, the document image obtaining unit 410 may be in the form of an external module connected to the camera or may be embedded in the camera.

Alternatively, a document image that is captured in advance and stored may be obtained. In this case, the document image may be stored in the storage unit 450 or stored in an additional apparatus, a memory or an external server, but is not limited thereto.

The text line extracting unit 420 performs imaging processing of extracting text lines constituting a document from the document image obtained by using the document image obtaining unit 410.

Although text lines formed by letters of a document printed on paper which is laid flat are linear, if a geometrically distorted surface such as a page of an opened book is captured by using a camera, text lines are curved. Thus, a degree of distortion of a surface of a document may be estimated based on a degree in which text lines are bent, and the text lines are linearized based on the degree of distortion to perform document dewarping.

A typical process of extracting text lines includes binarization, extracting of text lines, extracting of depths, or the like.

First, a document image is binarized. Binarization is performed to distinguish foreground contents on which letters or images are printed from the background. A basic binarization method may be used in which the binarization is achieved by applying the same threshold to all pixels. Alternatively, in a more advanced manner, a binarization method may be used in which thresholds to be applied to respective pixels are adaptively calculated.

Text lines are extracted by using information classified as a foreground after binarizing the document image, and to this end, a method of analyzing connected components is most frequently used. In this method, a mass that is continuous without interruption is perceived as one letter and letters are connected by horizontally moving from the left to the right of a document.

Here, a method of searching letters located above or below horizontal lines within a predetermined angle by considering bending of text lines or a method of extracting text lines by considering descenders may be used. Recently, a method of using morphology to find text lines has been frequently used.

When text lines are extracted, a degree of bending of the extracted text lines is detected and the text lines are linearized to dewarp the document image.

The determining unit 430 determines a projection formula which is used to convert positions of points constituting the text lines extracted by using the text line extracting unit 420 to coordinates on a plane of a dewarped document and a target function which is used to calculate a difference between the text lines projected by using the projection formula and real text lines. Also, according to another embodiment of the present disclosure, the determining unit 430 may further determine a target function which is used to calculate a difference between the text lines projected by using the projection formula and real text lines and uniformity of distances between the text lines.

The projection formula is determined based on a three-dimensional angle between the camera that has captured a document image and a plane of the document image, a cross-section of the document image, and a focal distance of the camera.

When the parameters described above (the three-dimensional angle between the camera that has captured the document image and the plane of the document image, the cross-section of the document image, and the focal distance of the camera) are exactly known, an optimal dewarped conversion document may be obtained by applying the parameters to the projection formula. However, since the parameters are not exactly known, a target function which is used to calculate optimum parameters is needed.

The target function is determined to calculate parameters for obtaining an optimum dewarped conversion document. The target function uses the assumption that coordinates obtained when projecting the text lines extracted by using the text line extracting unit 420 onto a plane of a document by using the projection formula determined by using the determining unit 430 form horizontal lines. The reason is because text lines in a general dewarped document are horizontal lines.

According to an embodiment of the present disclosure, a target function is designed to calculate a difference between respective points of text lines extracted from a document image captured by using a camera and coordinates on horizontal lines on a plane of a dewarped document, which are obtained by converting the respective points. Parameters, whereby respective target functions, are minimized may be calculated using various non-linear optimization methods.

It is only determined whether or not the projected text lines are horizontal lines from the parameters calculated as described, without considering distances between the text lines, and thus, it may be difficult to estimate a normal vector of the document plane.

According to another embodiment of the present disclosure, a target function is designed to calculate a difference between respective points of text lines extracted from a document image captured by using a camera and coordinates to which the points are converted on horizontal lines on a plane of a dewarped document and uniformity of distances between the respective text lines.

According to another embodiment of the present disclosure, the determining unit calculates, in a first operation, a parameter at which a difference between respective points of text lines extracted from a document image captured by using a camera and coordinates to which the points are converted on horizontal lines on a plane of a dewarped document is the smallest. In a second operation of determining a parameter, the parameter obtained in the first operation is used as an initial value to calculate a parameter that optimizes a target function in which uniformity of distances between the text lines is additionally used. The parameters may be improved and updated.

The converting unit 440 substitutes the parameters that optimize the target function calculated by using the determining unit 430 into the projection formula to convert the document image captured by using a camera and obtained by using the document image obtaining unit 410, to a dewarped document.

The storage unit 450 stores various information so that the apparatus 400 that converts the document image captured by using a camera to a dewarped document may determine and display various information needed to convert the document image to a dewarped document.

For example, the storage unit 450 may temporarily store the document image obtained by using the document image obtaining unit 410 in a volatile memory and thus may be able to easily load data in a conversion process or may store the document image in a non-volatile memory and convert the same to a dewarped document later when necessary.

Also, the storage unit 450 may store text lines extracted by using the text line extracting unit 420 and the projection formula, the target function or the parameters determined by using the determining unit 430 or the like, and may store the dewarped document obtained by conversion by using the converting unit 440.

The display unit 460 displays information about an operation of converting a document image captured by using a camera to a dewarped document so that a user may check a current state or displays the converted dewarped document so that the user may check a conversion result.

The control unit 470 controls overall operations of the apparatus 400 that converts a document image captured by using a camera to a dewarped document, and controls the document image obtaining unit 410, the text line extracting unit 420, the determining unit 430, the converting unit 440, the storage unit 450, and the display unit 460, so that the apparatus 400 may convert the document image captured by using a camera to a dewarped image.

Figure 5:
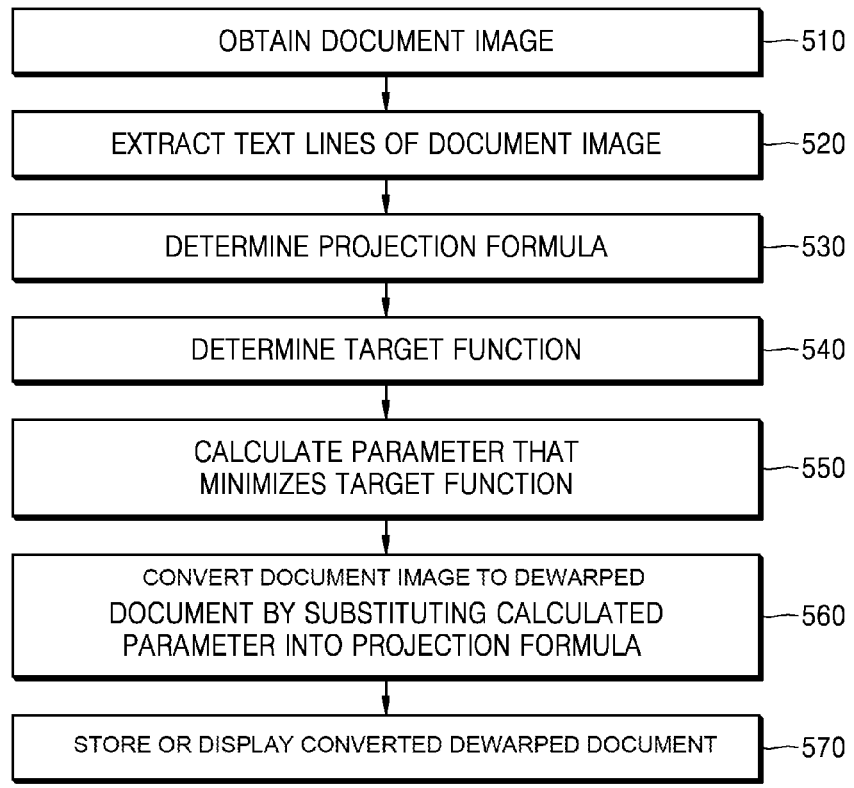
FIG. 5 is a flowchart of a method of converting a document image captured using a camera to a dewarped document according to an embodiment of the present disclosure.

FIG. 5 is a flowchart of a method of converting a document image captured using a camera to a dewarped document according to an embodiment of the present disclosure.

Referring to FIG. 5, a flowchart of a method of converting a document image captured using a camera to a dewarped document, is illustrated, where, first, a document image is obtained in operation 510 by using the document image obtaining unit 410. The obtained document image is a document image captured by using a typical camera, particularly, a digital camera, and contains geometric distortion of a document itself and perspective distortion that is generated during projection by the camera.

The document image may be obtained in real time by using a camera connected as an external module or an embedded camera. Alternatively, according to another embodiment of the present disclosure, the document image may be a document image stored in the storage unit 450. Alternatively, a document image stored in an additional device, a memory, or an external server may be received by using a communication module, but the embodiments are not limited thereto.

When a document image is obtained, text lines are extracted from the document image in operation 520. A typical process of extracting text lines includes binarization, extracting of text lines, and extracting of depths or the like.

First, a document image is binarized. Binarization is performed to distinguish foreground contents on which letters or images are printed from the background. A basic binarization method may be used in which the binarization is achieved by applying the same threshold to all pixels. Alternatively, in a more advanced manner, a binarization method may be used in which thresholds to be applied to respective pixels are adaptively calculated.

Text lines are extracted by using information classified as a foreground after binarizing the document image, and to this end, a method of analyzing connected components is most frequently used. In this method, a mass that is continuous without interruption is perceived as one letter and letters are connected by horizontally moving from the left to the right of a document.

Here, a method of searching letters located above or below horizontal lines within a predetermined angle by considering bending of text lines or a method of extracting text lines by considering descenders may be used. Recently, a method of using morphology to find text lines has been frequently used.

When the text lines of the document image are extracted, a projection formula to convert position of respective points constituting the extracted text lines to coordinates projected on a place of a dewarped document is determined in operation 530.

The projection formula is determined based on a three-dimensional rotational angle $\Theta=[\theta_1\ \theta_2\ \theta_3]^T$ formed by the camera that has captured the document image and the plane of the document image, a coefficient $a_m$ of a polynomial $g(x)=\Sigma a_m x^m$ which is used to approximate a curve of a cross-section of the document image, and a focal distance f of the camera that has captured the document image. In the polynomial $g(x)=\Sigma a_m x^m$, 'x' is a distance from some point on the document and '$a_m$' is a coefficient of the m-th order curve which is one of the components of the polynomial g(x).

When the projection formula is determined, a target function which is used to calculate an optimum parameter to be substituted into the projection formula is determined in operation 540.

When the parameters described above (the three-dimensional angle between the camera that has captured the document image and the plane of the document image, the cross-section of the document image, and the focal distance of the camera) are exactly known, an optimal dewarped conversion document may be obtained by applying the parameters to the projection formula. However, since the parameters are determined according to photographing environment and conditions and are not exactly known, a target function which is used to calculate optimum parameters is needed.

The target function is determined to calculate parameters for obtaining an optimum dewarped conversion document. The target function uses the assumption that coordinates obtained when projecting the text lines extracted by using the text line extracting unit 420 onto a document plane by using the projection formula determined by using the determining unit 430 form horizontal lines. The reason is because text lines in a general dewarped document are horizontal lines.

The target function may be determined based on a difference between text lines that are projected onto the document plane by using the projection formula and real text lines. Also, according to another embodiment of the present disclosure, the determining unit 430 may further determine a target function based on a difference between text lines projected by using the projection formula and uniformity between the text lines.

When the target function is determined, a parameter that minimizes the target function is calculated in operation 550.

According to an embodiment of the present disclosure, regarding the target function determined based on the difference between text lines that are projected by using the projection formula and real text lines and uniformity between the text lines, the smaller the target function, the better the quality of a dewarped image.

The parameter that optimizes the target function according to the current embodiment of the present disclosure is $(\theta_1,\theta_2,\theta_3,\{l^k\},\{a_m\})$, where $l^k$ denotes y coordinates of a k-th text line on a plane of a real document.

The optimized parameter $(\theta_1,\theta_2,\theta_3,\{l^k\},\{a_m\})$ may be calculated with respect to the target function by using various non-linear optimization methods, and as the target function according to the current embodiment of the present disclosure is differentiable, a differentiation value of each parameter that is needed in an optimization operation may be calculated.

When the parameter that optimizes the target function is calculated, the calculated parameter is substituted into the projection formula that is determined in operation 530 to complete the projection formula, and the document image is converted to a dewarped document in operation 560 by using the projection formula. After this operation, a final result image is obtained.

After the document image is converted to a dewarped document, according to necessity, the dewarped document is stored in the storage unit 450 for preservation or is displayed on the display unit 460 so that the user may check the dewarped document in operation 570.

Hereinafter, the operations of the method of FIG. 5 will be described with reference to FIGS. 6 to 10.

Figure 6:
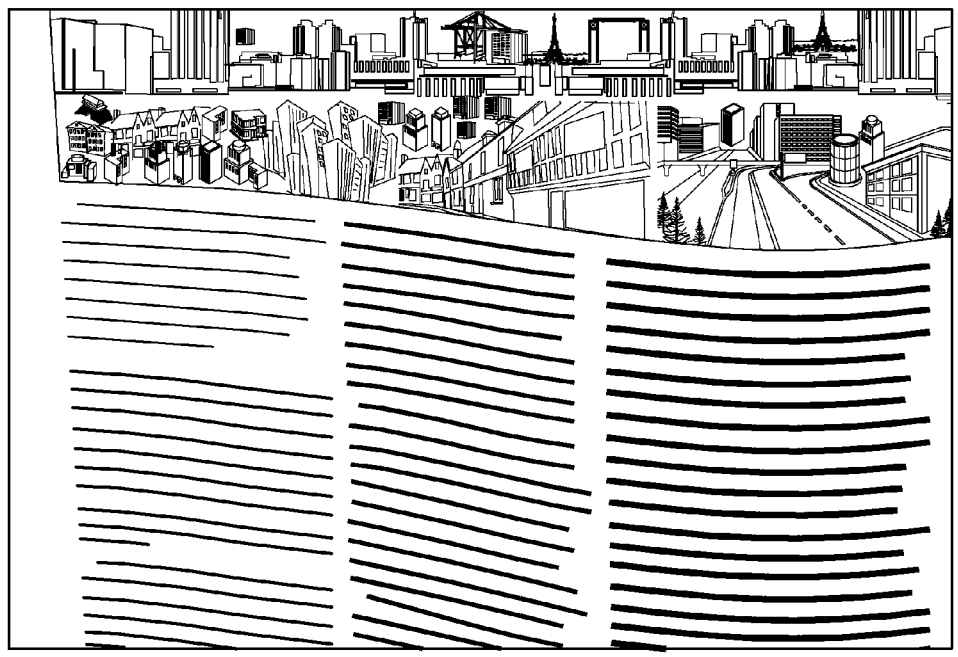
FIG. 6 illustrates a result of extracting text lines from a document image captured using a camera according to an embodiment of the present disclosure.

FIG. 6 illustrates a result of extracting text lines from a document image captured using a camera according to an embodiment of the present disclosure.

Referring to FIG. 6, although text lines formed by letters of a document printed on paper which is laid flat are linear, if a geometrically distorted surface such as a page of an opened book is captured by using a camera or if perspective distortion is caused according to an angle between the camera and the original document, text lines may be curved. Thus, a degree of distortion of a surface of a document may be estimated based on a degree in which text lines are bent, and the text lines are linearized based on the degree of distortion to perform document dewarping.

A typical process of extracting text lines include binarization, extracting of text lines, extracting of depths, or the like.

First, a document image is binarized. Binarization is performed to distinguish foreground contents on which letters or images are printed from the background. A basic binarization method may be used in which the binarization is achieved by applying the same threshold to all pixels. Alternatively, in a more advanced manner, a binarization method may be used in which thresholds to be applied to respective pixels are adaptively calculated.

Text lines are extracted by using information classified as a foreground after binarizing the document image, and to this end, a method of analyzing connected components is most frequently used. In this method, a mass that is continuous without interruption is perceived as one letter and letters are connected by horizontally moving from the left to the right of a document.

Here, a method of searching letters located above or below horizontal lines within a predetermined angle by considering bending of text lines or a method of extracting text lines by considering descenders may be used. Recently, a method of using morphology to find text lines has been frequently used.

When text lines are extracted, a degree of bending of the extracted text lines is detected and the text lines are linearized to dewarp the document image.

FIG. 7 is a schematic view illustrating coordinates of text lines extracted from a document image which are projected as coordinates of an image captured by using a camera according to an embodiment of the present disclosure. Further, FIGS. 8A and 8B are schematic views of a cross-section of a document shown as a curve according to an embodiment of the present disclosure.

Referring to FIG. 7, a schematic view illustrating coordinates 721 of text lines extracted from a document image is illustrated, in which the text lines are projected onto coordinates 711 of an image captured by using a camera according to an embodiment of the present disclosure.

Referring to FIGS. 7, 8A, and 8B, a document is placed on an x-y plane and may have a curve in an x-axis direction, and text lines of the document may also be curved according to the curve of the document in the x-axis direction. Also, a projection direction is assumed to be a z-axis direction.

The projection formula is determined based on a three-dimensional rotational angle $\Theta=[\theta_1 \ \theta_2 \ \theta_3]^T$ formed by the camera that has captured a document image and a plane of the document image, a coefficient $a_m$ of a polynomial $g(x)=\Sigma a_m x^m$ which is used to approximate a curve of a cross-section of the document image, and a focal distance f of the camera that has captured the document image.

A three-dimensional rotational matrix $R(\theta_1,\theta_2,\theta_3)$ formed by the plane of the document image and the camera that has captured the document image is determined based on three-dimensional angles $(\theta_1,\theta_2,\theta_3)$ formed by the camera that has captured the document image and x, y, and z planes of the document image, and $R(\theta_1,\theta_2,\theta_3)$ is given as a formula below.

$$R(\theta_1, \theta_2, \theta_3) = \begin{bmatrix} r_{11} & r_{12} & r_{13} \\ r_{21} & r_{22} & r_{23} \\ r_{31} & r_{32} & r_{33} \end{bmatrix} = \begin{bmatrix} \hat{r}_1^T \\ \hat{r}_2^T \\ \hat{r}_3^T \end{bmatrix}$$

Referring to FIG. 8B, a cross-section of the document image in a z-axis direction may be approximated by a polynomial g(x) which is given as a formula below.

$$g(x) = \sum_{m=0}^{n} a_m x^m$$

The focal distance f of the camera may be obtained from EXchangable Image File format (EXIF) tag information.

A surface of a document 720 illustrated in FIG. 7 may be expressed by the formula below.

$$X(x,y) = x\hat{r}_1 + y\hat{r}_2 + z\hat{r}_3 + O_f,$$

where (x,y) denotes coordinates within the plane of the document image and $O_f=(0,0,-f)$.

The above formula may model not only naturally curved document surfaces such as a book but also planar documents such as leaflets or business cards.

Here, when coordinates of an i-th point of a k-th text line are $(u_i^k, v_i^k)$, a ray that is transmitted through the i-th point is given as below.

$$P(t_i^k) = \tilde{p}_i^k \times t,$$

where $\tilde{p}_i^k = (u_i^k, v_i^k, f)$.

The ray $P(t_i^k)$ and an intersection point 721 of the surface of the document X(x,y) of FIG. 7 may be calculated by using the formula below.

$$g(X_i^k) = Z_i^k,$$

$$\text{where } \begin{bmatrix} X_i^k \\ Y_i^k \\ Z_i^k \end{bmatrix} = R \times (\tilde{p}_i^k t_i^k - O_f) = \begin{bmatrix} \hat{r}_1^T \\ \hat{r}_2^T \\ \hat{r}_3^T \end{bmatrix} \times (\tilde{p}_i^k t_i^k - O_f).$$

An intersection point 711 between a dewarped document plane 710 and the ray may be calculated by using the above-described method. $(X_i^k, Y_i^k, Z_i^k)$ that are obtained here are conversion coordinates that may be obtained when projecting the coordinates $(u_i^k, v_i^k)$ of the i-th point of the k-th text line of the document image captured by using the camera onto a surface of a dewarped document.

FIGS. 9A and 9B illustrate text lines extracted from a document image and projected text lines according to various embodiments of the present disclosure.

Specifically, FIGS. 9A and 9B illustrate a text line extracted from a document image and projected text lines according to an embodiment of the present disclosure.

Referring to FIGS. 9A and 9B, a text line 911 projected within a paragraph 910 of a document 900 does not exactly correspond to a real text line 912. This is because a projected text line is frequently curved due to distortion of a document image and bending of an original document whereas a real text line is horizontally straight.

Thus, a good quality of a converted dewarped document may indicate that distortion existing in text lines is corrected so that projected text lines are almost horizontal straight lines.

A target function $E_1$ uses the assumption that coordinates that are obtained when projecting text lines which are extracted in operation 520 of FIG. 5 onto a plane of a dewarped document by using the projection formula determined in operation 530 of FIG. 5 form horizontal straight lines.

Thus, the target function $E_1$ may be designed as below.

$$E_1(\theta_1, \theta_2, \theta_3, \{l^k\}, \{a_m\}) = \sum_k \sum_i E^2(k, i)$$

Here, $E(k,i) = y_i^k - l^k$ and $y_i^k$ denotes y conversion coordinates obtained by projecting an i-th point of a k-th text line of an image captured by using the camera, and $l^k$ denotes y coordinates of the k-th text line on a plane of a real dewarped document.

Referring to the formula, a square of a difference between the coordinates $y_i^k$ obtained by projecting the i-th point of the k-th text line of the image captured by using the camera onto a document plane and the coordinates $l^k$ on a plane of a real dewarped document, which is a horizontal line, always has a positive value, and a sum of values at the respective points along the text lines is the target function.

That is, when the respective points along the text lines extracted from the document image captured by using the camera are converted to coordinates on a plane of the dewarped document, the target function $E_1$ is an index function which is used to measure a degree of deviation of the coordinates from real text lines which are horizontal lines.

When the target function $E_1$ is smaller, the text lines are almost a horizontal line, and consequently, the quality of the converted dewarped document is better. Thus, the parameter that optimizes the target function $E_1$ is a parameter that allows the target function $E_1$ to be low. Here, the parameters that minimize the target function $E_1$ may be calculated by using various non-linear optimization methods.

Figure 10:
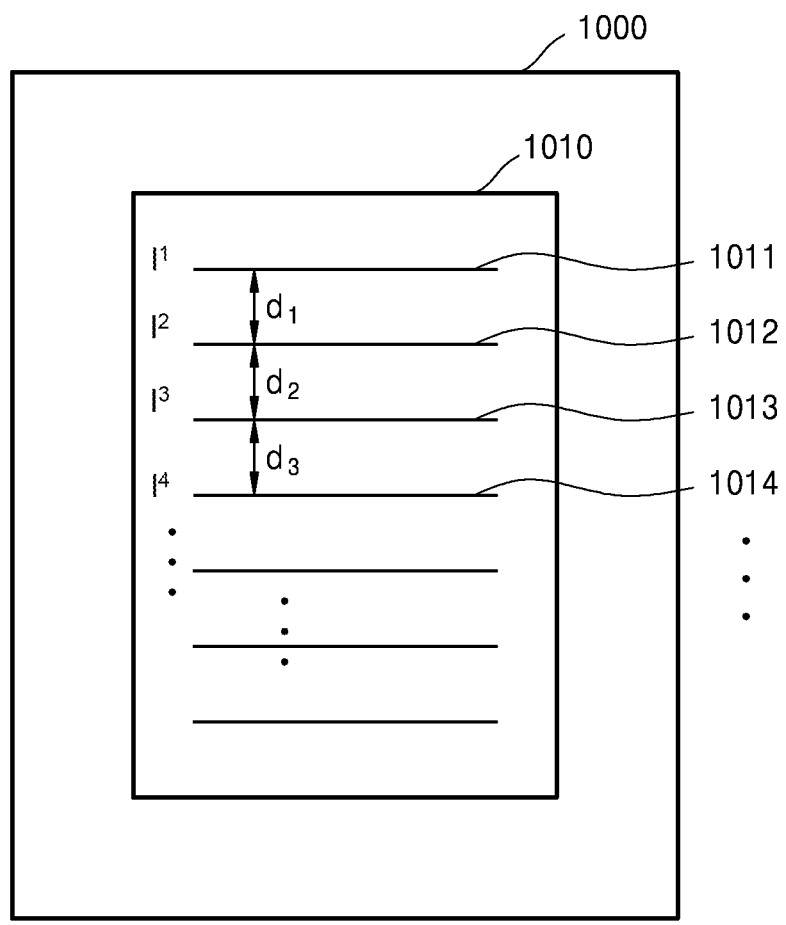
FIG. 10 illustrates distances between text lines extracted from a document image according to an embodiment of the present disclosure.

FIG. 10 illustrates distances between text lines extracted from a document image according to an embodiment of the present disclosure.

Referring to FIG. 10, a paragraph 1010 of a document 1000 is illustrated, where various text lines 1011, 1012, 1013, 1014, ... are present, and distances $(d_1, d_2, d_3, ...)$ between the text lines $(l^1, l^2, l^3, l^4, ...)$ may be the same or different than one another.

When extracting text lines, if distances between text lines are non-uniform, it is difficult to accurately extract the text lines, and this may cause a decrease in a quality of a converted dewarped document which is a final product.

The target function $E_1$ only determines whether projected text lines are horizontal lines, without considering distances between the text lines, and thus, it may be difficult to estimate a normal vector of a document plane. Thus, when designing a target function, distances between text lines, in detail, uniformity among the distances may be added as a variable for determining a target function $E_2$.

The target function $E_2$ uses the assumption that coordinates that are obtained by projecting the text lines extracted in operation 520 of FIG. 5 onto a plane of a dewarped document by using the projection formula determined in operation 530 of FIG. 5 are horizontal straight lines and also the assumption that a quality of a converted dewarped document may improve as the distances between the text lines become more uniform.

Thus, the target function $E_2$ may be designed as below:

$$E_2(\theta_1, \theta_2, \theta_3, \{l^k\}, \{a_m\}) = \sum_k \sum_i E^2(k, i) + \sum_k D^2(k-1, k, k+1)$$

$E(k,i) = y_i^k - l^k$ and $D(k-1, k, k+1) = (l^{k-1} - 2l^{k+1})$, and $y_i^k$ denotes coordinates obtained by projecting an i-th point of a k-th text line of an image captured by using the camera on the document plane, and $l^k$ denotes y coordinates of the k-th text line on a plane of a real document. The added term $D(k-1, k, k+1)$ is a term which is used to measure uniformity among the distances between the text lines and is induced by $D(k-1,k, k+1) = (l^{k-1} - l^k) - (l^k - l^{k+1})$, and as uniformity of the distances between the text lines increases, the absolute value of the term becomes smaller.

That is, when the respective points of the text lines extracted from the document image captured by using the camera are converted to coordinates on a plane of the dewarped document, the target function $E_2$ is an index function which is used to calculate a degree of deviation of the coordinates from real text lines which are horizontal lines and also uniformity of the distances between the text lines.

When the target function $E_2$ is smaller, the text lines are almost a horizontal line and the more uniform are the distances between the text lines, and consequently, the quality of the converted dewarped document is better. Thus, the parameter that optimizes the target function $E_2$ is a parameter that allows $E_2$ to be low. Here, the parameters that minimize the target function $E_2$ may be calculated by using various non-linear optimization methods.

Figure 11:
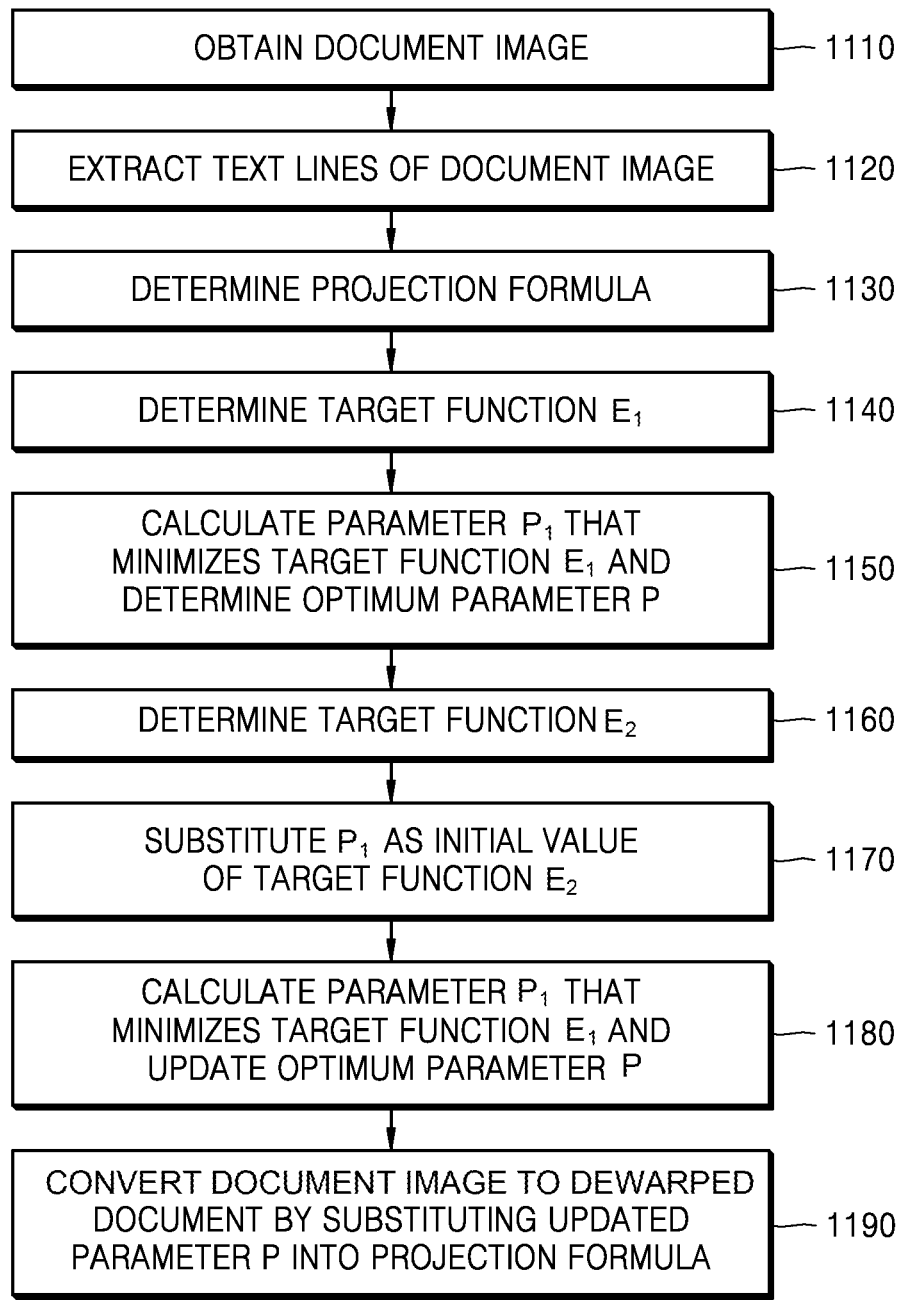
FIG. 11 is a flowchart of a method of converting a document image captured using a camera to a dewarped document according to an embodiment of the present disclosure.

FIG. 11 is a flowchart of a method of converting a document image captured using a camera to a dewarped document according to an embodiment of the present disclosure.

The flowchart of FIG. 11 is similar to the flowchart of FIG. 5, but differs in that an initial value is used to calculate a parameter that optimizes a target function and the parameter is updated to a newly calculated parameter.

Referring to FIG. 11, a flowchart is illustrated, wherein the flowchart identifies an operation 1110 of obtaining a document image captured using a camera, an operation 1120 of extracting text lines from the document image, and operation 1130 of determining a projection formula to convert positions of respective points constituting the extracted text lines to coordinates projected on a plane of the dewarped document. These operations are the same as those operations described with reference to FIG. 5.

However, when the projection formula is determined, a target function is not immediately determined. Instead, a target function $E_1$ which is used to calculate an "initial value" of an optimum parameter to be substituted into the projection formula is determined in operation 1140. The target function $E_1$ is as described with reference to FIGS. 9A and 9B.

The target function $E_1$ uses the assumption that coordinates obtained when projecting the text lines extracted by using the text line extracting unit 420 onto a document plane by using the projection formula determined by using the determining unit 430 form horizontal lines. The reason is because text lines in a general dewarped document are horizontal lines.

However, as the target function $E_1$ determines only whether the projected text lines are horizontal lines or not, without considering distances between the text lines, it may be difficult to estimate a normal vector of the document plane.

Accordingly, after a parameter $P_1$ for optimizing the target function $E_1$ is calculated in operation 1150 to determine an optimum parameter P, a target function $E_2$, to which a term is added that considers the distances between the text lines, in detail, uniformity of the distances, is determined in operation 1160. The target function $E_2$ is as described with reference to FIG. 10.

When the target function $E_2$ is determined, the optimum parameter P is substituted into an initial value in operation 1170, and a parameter $P_2$ for optimizing the target function $E_2$ is calculated to update the optimum parameter P.

Parameters that minimize the target function $E_1$ and the target function $E_2$ may be calculated by using various non-linear optimization methods in operation 1180.

When the optimum parameter P is updated in operation 1180, the updated optimum parameter P is substituted into the projection formula determined in operation 1130 to complete the projection formula. Then the projection formula is used to convert the document image to a dewarped document in operation 1190. After this operation, a final result image is obtained.

Although not illustrated in FIG. 11, when the document image is converted to a dewarped document, according to necessity, the dewarped document is stored in the storage unit 450 for preservation or displayed on the display unit 460 so that the user may check the same.

As described above, according to the one or more of the above embodiments of the present disclosure, by using one document image captured by using a typical digital camera and without using an additional scanner, a dewarped document may be generated regardless of whether a document is standardized or not.

The embodiments of the present disclosure can be implemented as program instructions that can be executed using various computer components and can be written to a non-transitory computer readable recording medium. The computer readable recording medium may include program instructions, a data file, a data structure etc. alone or in combination. Also, data structures used in the embodiments of the present disclosure may be written to the computer readable recording medium using various means. The program instruction written to the computer readable recording medium may be specifically designed and configured for the embodiments of the present disclosure or may be well-known and available to one of ordinary skill in the art. Examples of the computer readable recording medium include magnetic storage media (e.g., hard disks, floppy disks, magnetic tapes, etc.), optical recording media (e.g., CD-ROMs, or DVDs), magneto-optical media (e.g., floptical disks), and hardware devices specifically configured to store and execute program instructions (e.g., ROM, RAM, flash memories, etc.). Examples of the program instructions include not only machine codes generated by using a compiler but also high-level language codes that can be executed on a computer by using an interpreter or the like. The hardware device may be modified to at least one software module in order to execute processing according to the embodiments, and vice versa.

It should be understood that the various embodiments described therein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of an apparatus for converting a document image captured using a camera to a dewarped document, the method comprising:
    obtaining, by the apparatus, a document image captured using the camera;
    extracting text lines from the document image;
    determining a projection formula to convert positions of respective points constituting the extracted text lines to coordinates projected on a plane of the dewarped document;
    determining a target function (E) which is used to calculate a difference between text lines projected on the plane of the dewarped document using the projection formula and real text lines;
    calculating parameters that minimize the target function (E); and
    converting the document image to the dewarped document by substituting the calculated parameters into the projection formula.

2. The method of claim 1, wherein the projection formula is determined based on an angle between a plane of the document image and the camera, a cross-section of the document image, and a focal distance of the camera.

3. The method of claim 2,
    wherein the angle is a three-dimensional rotational angle $\Theta=[\theta_1\ \theta_2\ \theta_3]^T$ between the plane of the document image and the camera,
    wherein the cross-section of the document image is a curve $g(x)=\Sigma a_m x^m$,
    wherein the focal distance of the camera is a focal distance f of the camera, and
    wherein a horizontal direction of the document image is an x-axis direction, a projection direction is a z-axis direction, and ($\theta_1\ \theta_2\ \theta_3$) are angles between the plane of the document image and the camera with respect to x, y and z axes, respectively.

4. The method of claim 3, wherein the target function (E) is $E(\theta_1,\theta_2,\theta_3,\{l^k\}$, $$\{a_m\}) = \sum_k \sum_i E^2(k, i),$$

where $E(k,i)=y_i^k-l^k$, and $y_i^k$ denotes y conversion coordinates obtained by projecting an i-th point of a k-th text line of an image captured using the camera on a plane of a document, and $l^k$ denotes y coordinates of the k-th text line on a plane of a real document.

5. The method of claim 4, wherein the calculating of the parameters further includes calculating the parameters ($\theta_1$, $\theta_2,\theta_3,\{l^k\},\{a_m\}$) that minimize the target function.

6. The method of claim 3, wherein the determining of the target function (E) further comprises determining the target function (E) using uniformity of distances between the text lines.

7. The method of claim 6, wherein the target function (E) is $E(\theta_1,\theta_2,\theta_3,\{l^k\}$, $$\{a_m\}) = \sum_k \sum_i E^2(k, i),$$

where $E(k,i)=y_i^k-l^k$, and $y_i^k$ denotes y conversion coordinates obtained by projecting an i-th point of a k-th text line of an image captured using the camera on a plane of a document, and $l^k$ denotes y coordinates of the k-th text line on a plane of a real document.

8. The method of claim 7, wherein the calculating of the parameters further includes calculating the parameters ($\theta_1$, $\theta_2,\theta_3,\{l^k\},\{a_m\}$) that minimize the target function.

9. The method of claim 1, further comprising storing the dewarped document.

10. The method of claim 1, further comprising displaying the dewarped document.

11. An apparatus for converting a document image captured using a camera to a dewarped document, the apparatus comprising:
    a document image obtaining unit configured to obtain the document image captured using the camera;
    a text line extracting unit configured to extract text lines from the document image;
    a determining unit configured to determine a projection formula to convert positions of respective points constituting the extracted text lines to coordinates projected on a plane of the dewarped document and to determine a target function (E) which is used to calculate a difference between the text lines projected on the plane of the dewarped document using the projection formula and real text lines; and a converting unit configured to calculate parameters that minimize the target function and to convert the document image to the dewarped document by substituting the calculated parameters into the projection formula.

12. The apparatus of claim 11, wherein the projection formula is determined based on an angle between a plane of the document image and the camera, a cross-section of the document image, and a focal distance of the camera.

13. The apparatus of claim 12,
wherein the angle is a three-dimensional rotational angle $\Theta=[\theta_1\ \theta_2\ \theta_3]^T$ between the plane of the document image and the camera,
wherein the cross-section of the document image is a curve $g(x)=\Sigma a_m x^m$,
wherein the focal distance of the camera is a focal distance f of the camera, and
wherein a horizontal direction of the document image is an x-axis direction, and a projection direction is a z-axis direction, and $(\theta_1\ \theta_2\ \theta_3)$ are angles between the plane of the document image and the camera with respect to x, y and z axes, respectively.

14. The apparatus of claim 13, wherein the target function (E) is $E(\theta_1,\theta_2,\theta_3,\{l^k\},$ $$\{a_m\}) = \sum_k \sum_i E^2(k, i),$$

where $E(k,i)=y_i^k-l^k$, and $y_i^k$ denotes y conversion coordinates obtained by projecting an i-th point of a k-th text line of an image captured using the camera on a plane of a document, and $l^k$ denotes y coordinates of the k-th text line on a plane of a real document.

15. The apparatus of claim 14, wherein the converting unit is further configured to calculate the parameters $(\theta_1,\theta_2,\theta_3,\{l^k\},\{a_m\})$ that minimize the target function.

16. The apparatus of claim 13, wherein the determining unit is further configured to determine the target function (E) using uniformity of distances between the text lines.

17. The apparatus of claim 16, wherein the target function (E) is $E(\theta_1,\theta_2,\theta_3,\{l^k\},$ $$\{a_m\}) = \sum_k \sum_i E^2(k, i),$$

where $E(k,i)=y_i^k-l^k$, and $y_i^k$ denotes y conversion coordinates obtained by projecting an i-th point of a k-th text line of an image captured using the camera on a plane of a document, and $l^k$ denotes y coordinates of the k-th text line on a plane of a real document.

18. The apparatus of claim 17, wherein the converting unit is further configured to calculate the parameters, $(\theta_1,\theta_2,\theta_3,\{l^k\},\{a_m\})$ that minimize the target function.

19. The apparatus of claim 11, further comprising a storage unit configured to store the dewarped document.

20. The apparatus of claim 11, further comprising a display unit configured to display the dewarped document.

21. The apparatus of claim 11,
wherein the determining unit is further configured to calculate another target function ($E_2$), and
wherein the converting unit is further configured substitute the calculated parameters as an initial value of the other target function ($E_2$).

22. A non-transitory computer readable recording medium having a computer program recorded thereon, the computer program causing a computer to execute the method of claim 1.

* * * * *